US007155741B2

(12) United States Patent
Sobel et al.

(10) Patent No.: US 7,155,741 B2
(45) Date of Patent: Dec. 26, 2006

(54) ALTERATION OF MODULE LOAD LOCATIONS

(75) Inventors: William E Sobel, Stevenson Ranch, CA (US); Bruce McCorkendale, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 862 days.

(21) Appl. No.: 10/140,149

(22) Filed: May 6, 2002

(65) Prior Publication Data

US 2004/0177263 A1    Sep. 9, 2004

(51) Int. Cl.
*H04L 9/00* (2006.01)
(52) U.S. Cl. .................................................. 726/22
(58) Field of Classification Search ............ 726/22–25; 703/21
See application file for complete search history.

(56) References Cited

U.S. PATENT DOCUMENTS

| 5,842,002 | A | * | 11/1998 | Schnurer et al. ............... 703/21 |
| 5,949,973 | A | * | 9/1999 | Yarom ........................... 726/23 |
| 6,088,803 | A | | 7/2000 | Tso et al. |
| 6,301,699 | B1 | * | 10/2001 | Hollander et al. ........... 717/131 |
| 6,941,473 | B1 | * | 9/2005 | Etoh et al. ...................... 726/5 |

FOREIGN PATENT DOCUMENTS

WO    WO 01/37095 A1    5/2001

OTHER PUBLICATIONS

Randustack web pages [online]. Virtualave.net [retrieved May 1, 2003]. Retrieved from the Internet <URL: http://pageexec.virtualave.net/docs/randustack.txt>.

Randkstack web pages [online]. Virtualave.net [retrieved May 1, 2003]. Retrieved from the Internet: <URL: http://pageexec.virtualave.net/docs/randkstack.txt>.

Randmap web pages [online]. Virtualave.net [retrieved May 1, 2003]. Retrieved from the Internet: <URL: http://pageexec.virtualave.net/docs/randmmap.txt>.

Randexec web pages [online]. Virtualave.net [retrieved May 1, 2003]. Retrieved from the Internet: <URL: http://pageexec.virtualave.net/docs/randexec.txt>.

VMA mirroring web pages [online]. Virtualave.net [retrieved May 1, 2003]. Retrieved from the Internet: <URL: http://pageexec.virtualave.net/docs/vmmirror.txt>.

Chew, Monica and Song, Dawn, "Mitigating Buffer Overflows by Operating System Randomization", Dec. 2000, pp. 1-9, U.C. Berkeley, Berkeley, California, U.S.A.

(Continued)

*Primary Examiner*—Jacques Louis-Jacques
*Assistant Examiner*—Jacob Lipman
(74) *Attorney, Agent, or Firm*—Fenwick & West LLP

(57) ABSTRACT

Buffer overflow attacks are prevented by altering the load locations of commonly used executable code modules. A monitor layer (210) is associated with an operating system (220) and controls the load locations for predetermined modules containing executable code that can be used in the execution of buffer overflow attacks. The monitor layer (210) applies predetermined criteria to determine whether a module (280) presents a high risk for enabling a buffer overflow attack. If the monitor layer (210) determines that the module (280) presents a high risk, the monitor layer (210) may force the module (280) to load in an alternate location (290) by reserving sections of memory (295) into which the module normally loads. Alternatively, the monitor layer (210) may alter the area of the module that directs the operating system (220) to load it into a particular location (295), thus causing the operation system to load the module to an alternate location (290).

19 Claims, 9 Drawing Sheets

OTHER PUBLICATIONS

Choi, Yang-Seo, et al., "A New Stack Buffer Overflow Hacking Defense Technique with Memory Address Confirmation", *Lecture Notes in Computer Science 2288*, 2002, pp. 146-159, Springer Verlag, Berlin and Heidelberg, Germany.

Parkhouse, Jayne, "Pelican SafeTNet 2.0" [online], Jun. 2000, SC Magazine Product Review, [retrieved on Dec. 1, 2003]. Retrieved from the Internet: <URL: http://www.scmagazine.com/scmagazine/standalone/pelican/sc_pelican.html.

Szor, P. and Ferrie, P., "Hunting for Metamorphic", Virus Bulletin Conference Sep. 2001, Virus Bulletin Ltd., The Pentagon, Abingdon, Oxfordshire, England, pp. 123-144.

Aho, Alfred V., et al. Compilers, Addison-Wesly Publishing Company, USA, revised edition 1988.

Periot, Frederic, "Defeating Polymorphism Through Code Optimization", Paper given at the Virus Bulletin conference, Sep. 26-27 Oct. 2003 pp. 142-159, Toronto, Canada, published by Virus Bulletin Ltd., The pentagon, Abington, Oxfordshire, England.

\* cited by examiner

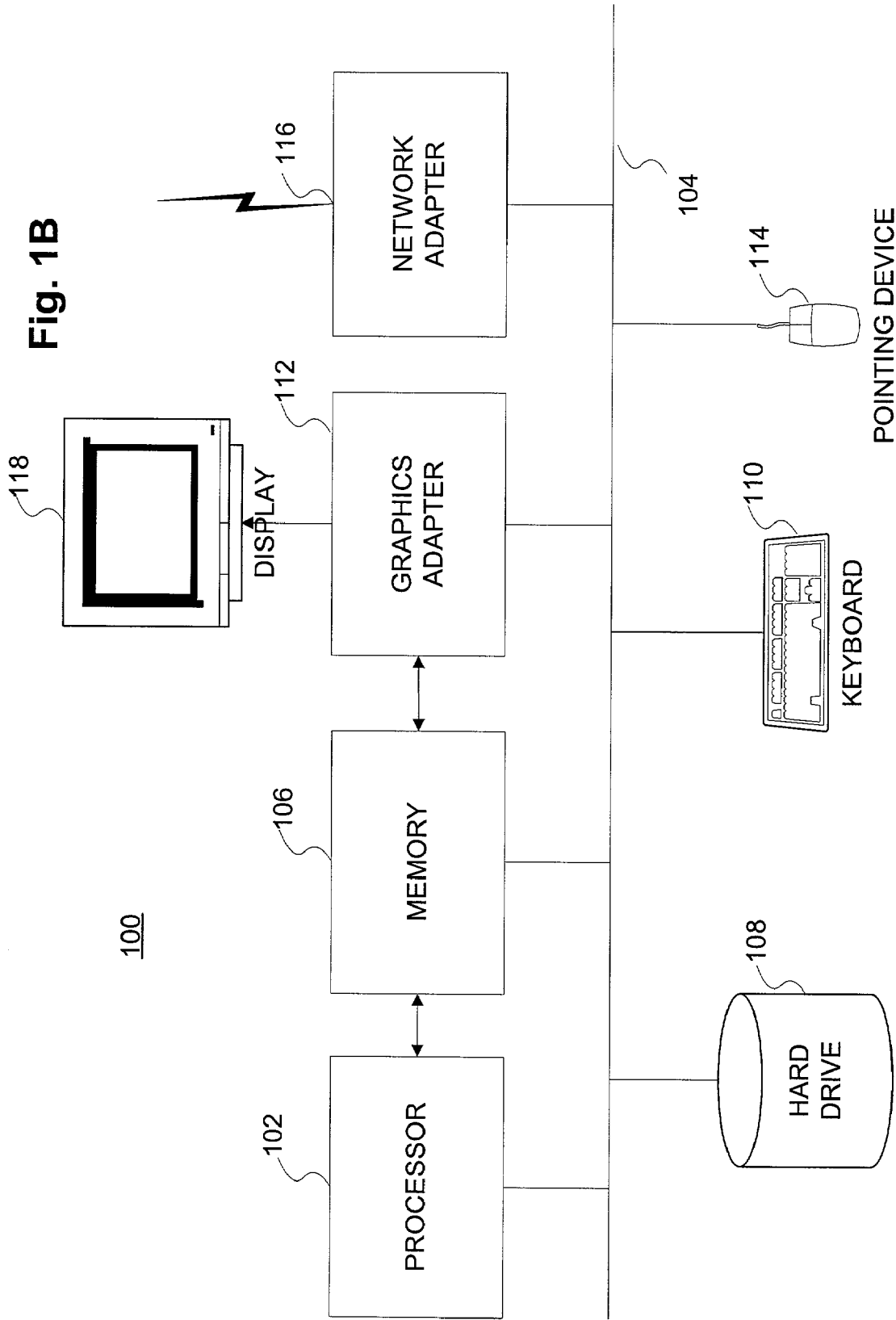

ALTERATION OF MODULE LOAD LOCATIONS

BACKGROUND OF THE INVENTION

1. Technical Field

This invention generally relates to computer security. Specifically, it relates to a method for preventing buffer overflow attacks in digital computers.

2. Background Art

During the brief history of computers, system administrators have been plagued by self-replicating programs such as viruses, worms, and Trojan Horses, which are designed to disable host computer systems and propagate themselves to connected systems.

In recent years, two developments have increased the threat posed by these malicious programs. Firstly, increased dependence on computers to perform mission critical business tasks has increased the economic cost associated with system downtime. Secondly, increased interconnectivity between computers has made it possible for viruses and worms to spread to a large number of systems in a matter of hours.

Viruses and worms sometimes employ buffer overflow attacks to attain control of a computer system. This method involves responding to a data request with a larger data string than that request is designed to accept. The larger data string spills into sections of memory that were configured to hold other values, such as the return address of the code being executed. When the code finishes its execution, the application in question, rather than reading memory at the previous return address, reads memory at the return address inserted by the virus. The new return address can either be the location of the newly inserted virus code, or that of a common system executable code module, which itself makes a call to the location where the virus code is located.

To maintain system resources, certain commonly used segments of executable code, known as "executable code modules," are loaded into fixed locations in the logical memory of certain application processes. These executable code modules are useful to the creators of viruses and worms as the modules can be used to execute malicious code and the modules' load addresses are often published or easily determinable. What is needed is a method of preventing viruses and other malicious agents from utilizing these executable code modules.

DISCLOSURE OF INVENTION

The present invention prevents malicious agents from utilizing executable code modules to enable buffer overflow attacks by forcing the modules to load at alternate memory locations. Successful buffer overflow attacks often must call executable code modules (280) at fixed locations in logical memory (285). Certain executable code modules may present a particularly high risk to enabling buffer overflow attacks by virtue of their use by multiple application processes and their presence in known memory addresses. The present invention prevents buffer overflow attacks by changing the region in memory in which "high-risk" executable code modules are loaded, thereby causing the attacks to fail because the attacking agents cannot access the instructions in the executable code of the modules.

The present invention utilizes a monitor layer (210) to selectively alter the load locations of executable code modules (280). A monitor layer (210) can be configured to sit between the operating system (220) and an application process (205) and to intercept any communications between the application process (205) and the operating system (220). The monitor layer (210) further manages any attempts by the operating system (220) to load executable code when first initiating a new application process. When an application process (205) or the operating system (220) attempts to load an executable code module (280) into memory (285), the monitor layer (210) applies predetermined criteria to determine whether the executable code module (280) is a high-risk module. If the executable code module (280) is determined to be a high-risk module, the monitor layer (210) reserves sections of memory between the original load location (295) and an alternate load location (290), thus forcing the module (280) to load in the alternate load location (290).

Alternatively, the monitor layer (210) may be configured to sit between the operating system (220) and a file system (235) and to intercept communications between the file system (235) and the operating system (220). When an application process (205) or the operating system (220) attempts to load a module, the monitor layer (210) determines whether the executable code module (280) is a high-risk module. If the executable code module (280) is a high-risk module, the monitor layer (210) edits the section of the module (280) containing its preferred load location, replacing the preferred load location with an alternate load location. The operating system (220) then loads the module (280) to the alternate load location (290).

BRIEF DESCRIPTION OF THE DRAWINGS

These and other more detailed and specific objects and features of the present invention are more fully disclosed in the following specification, reference being had to the accompanying drawings, in which:

FIG. 1B is a high-level block diagram of a computer system 100 for use as a web server 155 according to one embodiment of the present invention.

DETAILED DESCRIPTION OF THE PREFERRED EMBODIMENTS

The invention disclosed herein prevents buffer overflow attacks initiated by attacking agents. As used herein, the terms "attacking agent" and "malicious code" refer to any program, module, or piece of code that is loaded onto a system without the authorized user's knowledge and/or against the authorized user's wishes. The term "attacking agent" includes viruses, Trojan Horse programs, worms, and other such insidious software. An attacking agent may include the ability to replicate itself and compromise other computer systems. However, an attacking agent may lack the ability to self-replicate.

The embodiments discussed below describe a buffer overflow attack initiated by a virus through an HTTP socket. However, the present invention is applicable to any manner of buffer overflow attack initiated by any attacking agent.

Figure 1A:
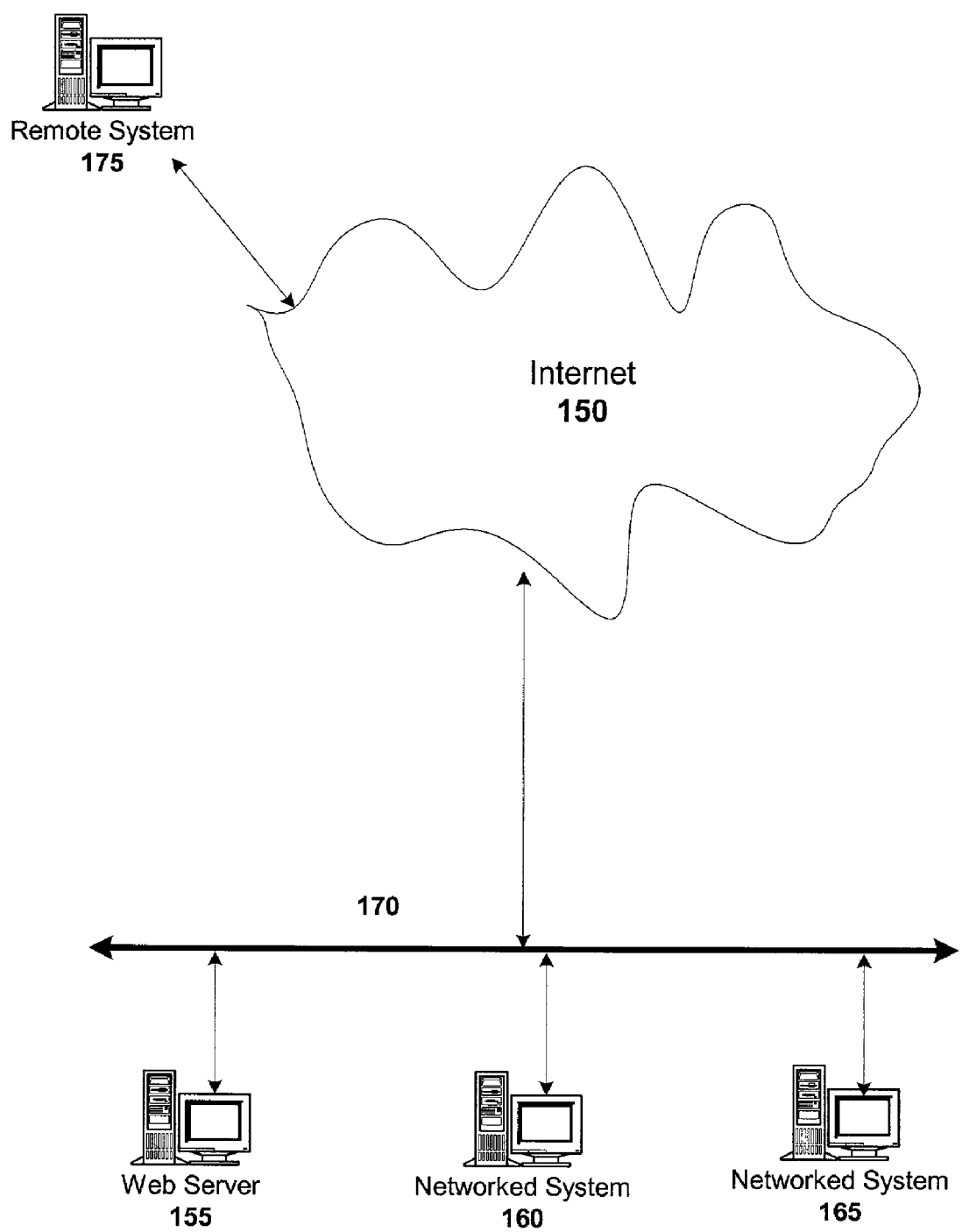
FIG. 1A is a high-level block diagram illustrating a computing environment in which one embodiment of the present invention can operate.

FIG. 1A is a high-level block diagram illustrating a computing environment in which one embodiment of the present invention can operate. A computer 155 functioning as a web server is connected to a local network 170 containing additional networked systems 160, 165. The local network 170 may be an Ethernet network, a Token Ring network, or some other form of local network. Additionally, the systems 155, 160, 165 are connected to the Internet 150. This connection may be achieved through a modem, Digital Subscriber Line (DSL), or any other manner of connection. A remote system 175 is also connected to the Internet 150 and can communicate with the web server 155 through the TCP/IP protocol.

FIG. 1B is a high-level block diagram of a computer system 100 for use as the web server 155 or networked computer 160, 165. Illustrated are at least one processor 102 coupled to a bus 104. Also coupled to the bus 104 are a memory 106, a storage device 108, a keyboard 110, a graphics adapter 112, a pointing device 114, and a network adapter 116. A display 118 is coupled to the graphics adapter 112.

The processor 102 may be any specific or general-purpose processor such as an INTEL x86 or POWERPC-compatible central processing unit (CPU). The storage device 108 may be any device capable of holding large amounts of data, such as a hard drive, compact disk read-only memory (CD-ROM), DVD, or some other form of fixed or removable storage device.

The memory 106 holds instructions and data used by the processor 102. The pointing device 114 may be a mouse, touch-sensitive display, or other type of pointing device and is used in combination with the keyboard 110 to input data into the computer system 100. The types of hardware and software within the computer system 100 may vary.

Figure 2A:
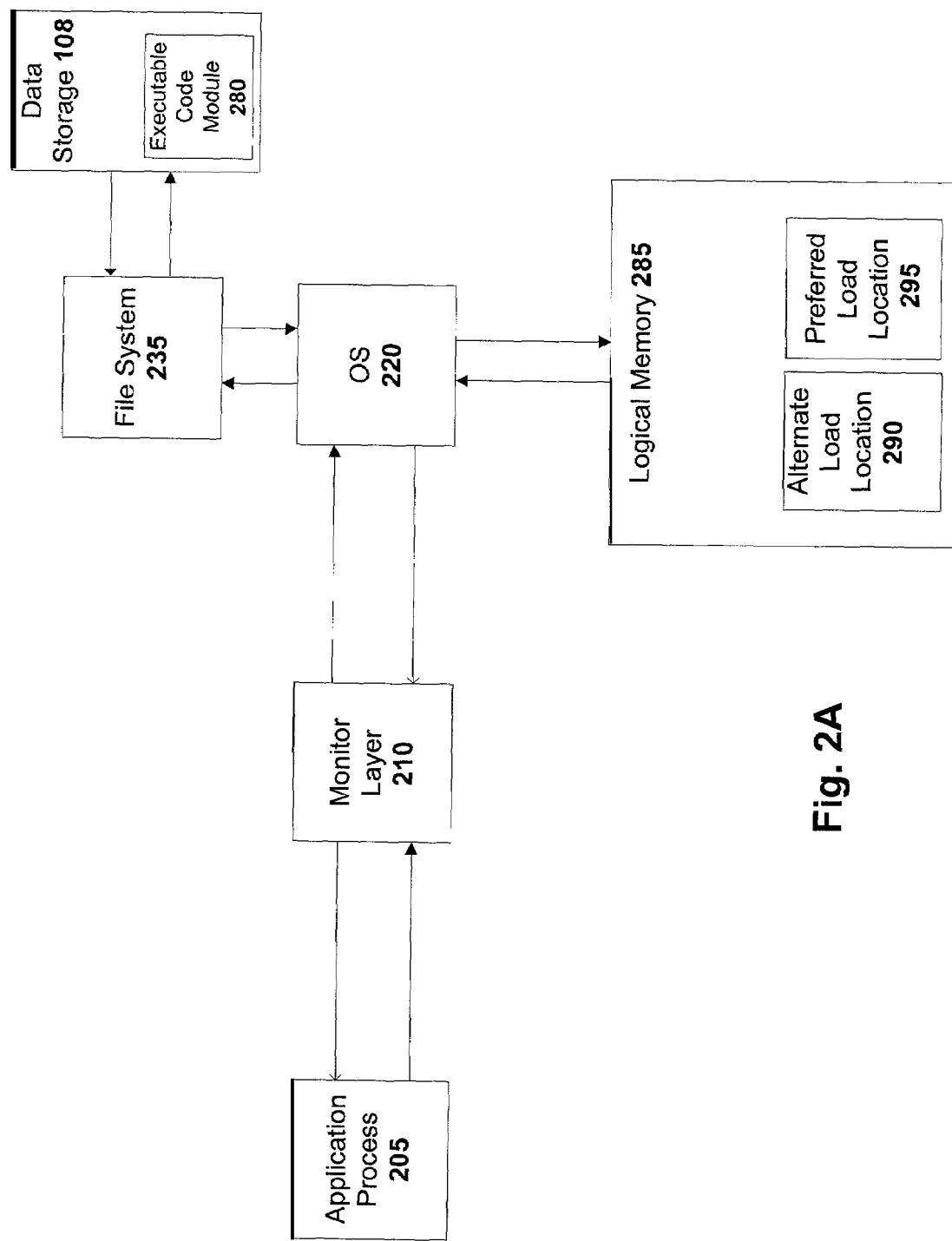
FIG. 2A is a block diagram illustrating the interaction between an operating system 220, a monitor layer 210, an application process 205, a file system 235, a data storage device 108, and a logical memory structure 285 in accordance with one embodiment of the present invention.

FIG. 2A is a block diagram illustrating the interaction between an operating system 220, a monitor layer 210, an application process 205, a file system 235, a data storage device 108, and a logical memory structure 285 in accordance with one embodiment of the present invention. The operating system 220 runs on the web server 155, and networked systems 160, 165, and maybe any of a number of multitasking operating systems such as Windows, Linux, or Solaris. The operating system 220 manages multiple application processes, and generates a logical memory structure 285 for each application process 205. The logical memory structure 285 is discussed in greater detail in FIG. 3A.

The application process 205 may be any application running on web server 155, such as a text editor, information server, or music playback program. The monitor layer 210 sits between the operating system 220 and the application process 205. The file system 235 is configured to control interaction with data storage 108. When the file system 235 receives a load request for an executable code module 280, the file system 235 determines the physical location of the executable code module 280 in data storage 108 and sends a request to data storage 108 to extract data from the physical location containing the requested module. Examples of these executable code modules include sections of files having DLL, EXE, or COM extensions as well as any other file format that contains executable code.

When the application process 205 attempts to load an executable code module 280 into logical memory 285, the monitor layer 210 intercepts the load request. Additionally, the monitor layer 210 intercepts any attempts by the operating system 220 to load executable code modules when first starting a new application process. In one embodiment, this intercepting is performed for all application processes. In an alternate embodiment, this intercepting is performed for only predetermined application processes. If the executable code module 280 is determined to be high-risk, and the executable code module 280 has a preferred load location, the monitor layer 210 determines the preferred load location of the module 280. The monitor layer 210 then reserves a block of memory including the preferred load location 295. The load request is passed to the operating system 220, which sends a load request to the file system 235, which extracts the executable code module 280 from data storage 108. The file system 235 returns the executable code module 280 to the operating system 220, which, finding the preferred load location 295 occupied, loads the executable code module 280 to the alternate load location 290.

The monitor layer 210 may be configured to bind itself to the operating system 220 to manage communications between the operating system 220 and the application process 205 and to further monitor any new load attempts by the operating system 220. In this embodiment, the monitor layer 210 acts as a transparent interface, presenting itself to the operating system 220 as the application process 205 and presenting itself to the application process 205 as the operating system 220. The monitor layer 210 may take advantage of "hooks" provided by the operating system that allow intermediate program layers to interface seamlessly with the operating system 220 and monitor communication between the operating system 220 and application processes. In one embodiment, the hooking of the operating system 220 is achieved through the SYMEVENT software product available from Symantec Corporation of Cupertino, Calif.

Alternatively, when the monitor layer 210 is installed, sections of the operating system 220 may be patched so as to reroute communications between the application process 205 and the operating system 220 through the monitor layer 210.

Figure 2B:
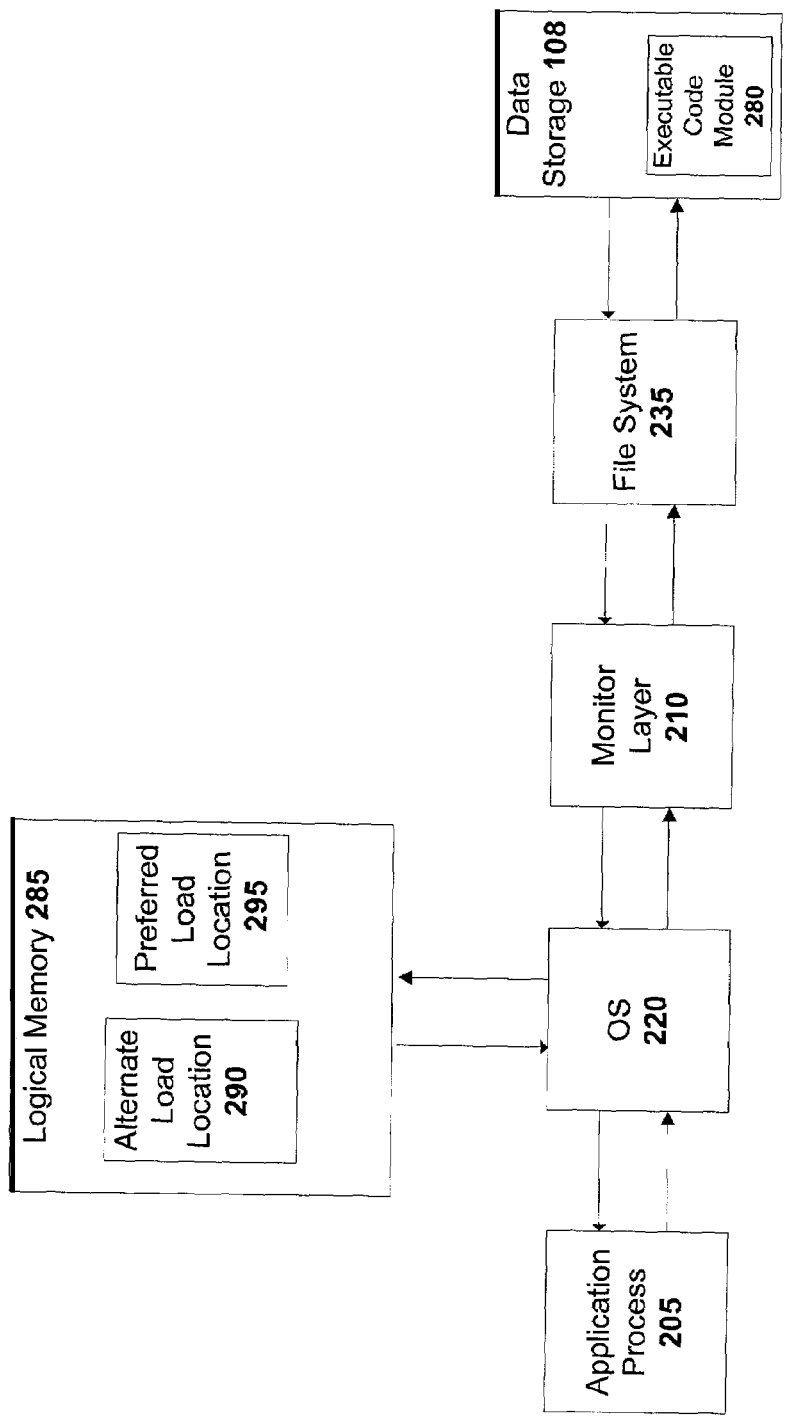
FIG. 2B is a block diagram illustrating the interaction between an operating system 220, a monitor layer 210, a file system 235, a data storage device 108, a logical memory structure 285, and an application process 205 in accordance with a second embodiment of the present invention.

FIG. 2B is a block diagram illustrating the interaction between an operating system 220, a monitor layer 210, a file system 235, a data storage device 108, a logical memory structure 285, and an application process 205 in accordance with a second embodiment of the present invention. In the present embodiment, when an application process 205 attempts to load an executable code module 280 to logical memory 285, its request is passed to the operating system 220, which sends a corresponding request to the file system 235. Alternatively, the operating system 220 may attempt to load the executable code module 280 directly when first loading a new application process. The monitor layer 210 intercepts the load request and, if the request is for a high-risk module, tags the request and sends it to the file system 235. The file system 235 extracts the executable code module 280 from data storage 108 and attempts to send the executable code module 280 to the operating system 210. The monitor layer 210 intercepts the communication and checks to see if the executable code module 280 corresponds to a tagged module request. If this is the case, the monitor layer 210 modifies the preferred load location 295 for the executable code module 280 and sends the module 280 to the operating system 220, which loads the executable code module 280 to the alternate load location 290.

As with embodiments where the monitor layer 210 binds itself to the operating system 220 so as to monitor communications between the operating system 220 and an application process 205, the monitor layer 210 may similarly be configured to sit transparently between the file system 235 and the operating system 220. This configuration may be achieved through hooking. Alternatively, when the monitor layer 210 is installed, it can be configured to rewrite the sections of the operating system 220 which communicate with the file system 235, so as to redirect all communications between the operating system 220 and the file system 235 through the monitor layer 210.

Figure 3A:
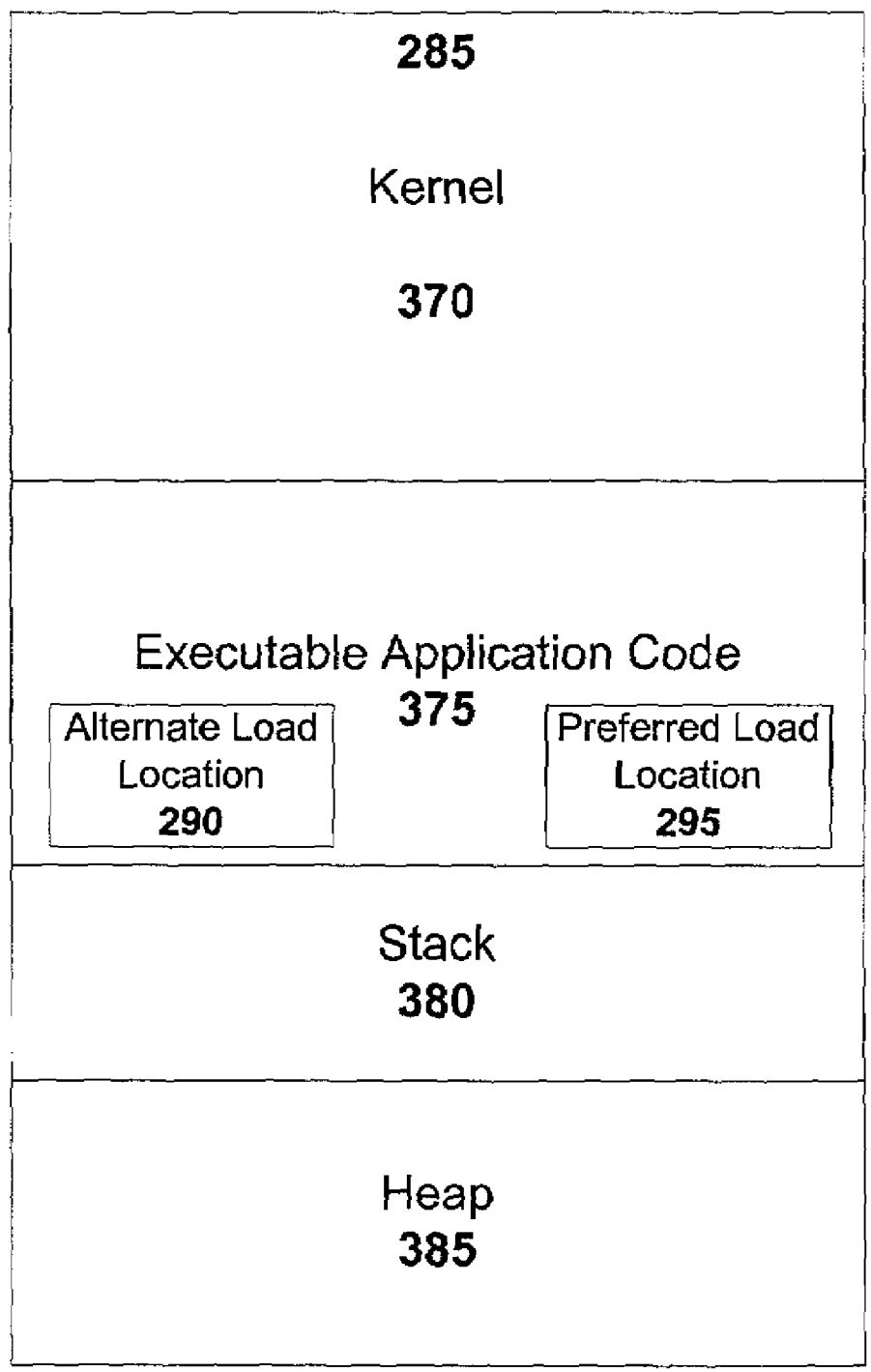
FIG. 3A is a block diagram illustrating in greater detail the logical memory structure 285 of an application process 205 running on a web server 155 in accordance with one embodiment of the present invention.

FIG. 3A is a block diagram illustrating in greater detail the logical memory structure 285 of an application process running on a web server 155 in accordance with one embodiment of the present invention. Multitasking operating systems generate separate logical memory structures 285 for each process, so as to insure that multiple applications do not attempt to access the same section of memory. These logical memory structures 285 are divided into a number of memory pages, each having a distinct address in logical memory.

Application processes store executable code and data in the logical memory structures, and the operating system 220 maps logical memory addresses to locations in physical memory 106 or data storage 108.

This logical memory structure 285 includes a range of addresses 370 for memory pages storing the operating system kernel, which is the executable code containing instructions for performing operating system-related tasks. The range of addresses 370 storing the kernel is inaccessible to an individual application process. For the most part, any attempt to write to the range 370 designated for the kernel causes a fault and stops operation of the process attempting the write.

Additionally, the memory structure 285 includes a range of memory addresses 375 designated for executable code relating to performing application process tasks. By way of example, if the application process in question were a word processing application, this section could include instructions for formatting text. When the application process is first executed, the executable code particular to that process is loaded into this section 375. As executable code modules are stored in the section designated for executable code, the preferred load location 295 and alternate load location 290 of a high-risk executable code module would likewise be located in this section 375.

Furthermore, the memory structure 285 includes a range of memory addresses designated for data particular to this application process. Specifically, it includes space 380 for a stack, which is memory space allotted for data having sizes which are known in advance. The memory structure 285 also includes space 385 for a heap, which is memory space allotted for data having sizes and organization which are not known until the application process 205 is running.

By maintaining a separate logical memory structure for each application process 205, the operating system 220 insures that multiple application processes do not attempt to access the same section of physical memory. However, this process of mapping multiple logical memory structures to locations in physical memory 106 and data storage 108 is very resource intensive. Thus, the operating system 220 stores certain commonly used modules in a fixed location in logical memory 285 for all application processes and maps that location to a fixed point in physical memory. By way of example, the commonly used module stat.dll might be preconfigured to always load at logical memory address 85,000, and the operating system 220 would map the physical memory location containing stat.dll to logical memory address 85,000 for every application process 205, thus reducing the management burden on the operating system 220.

Figure 3B:
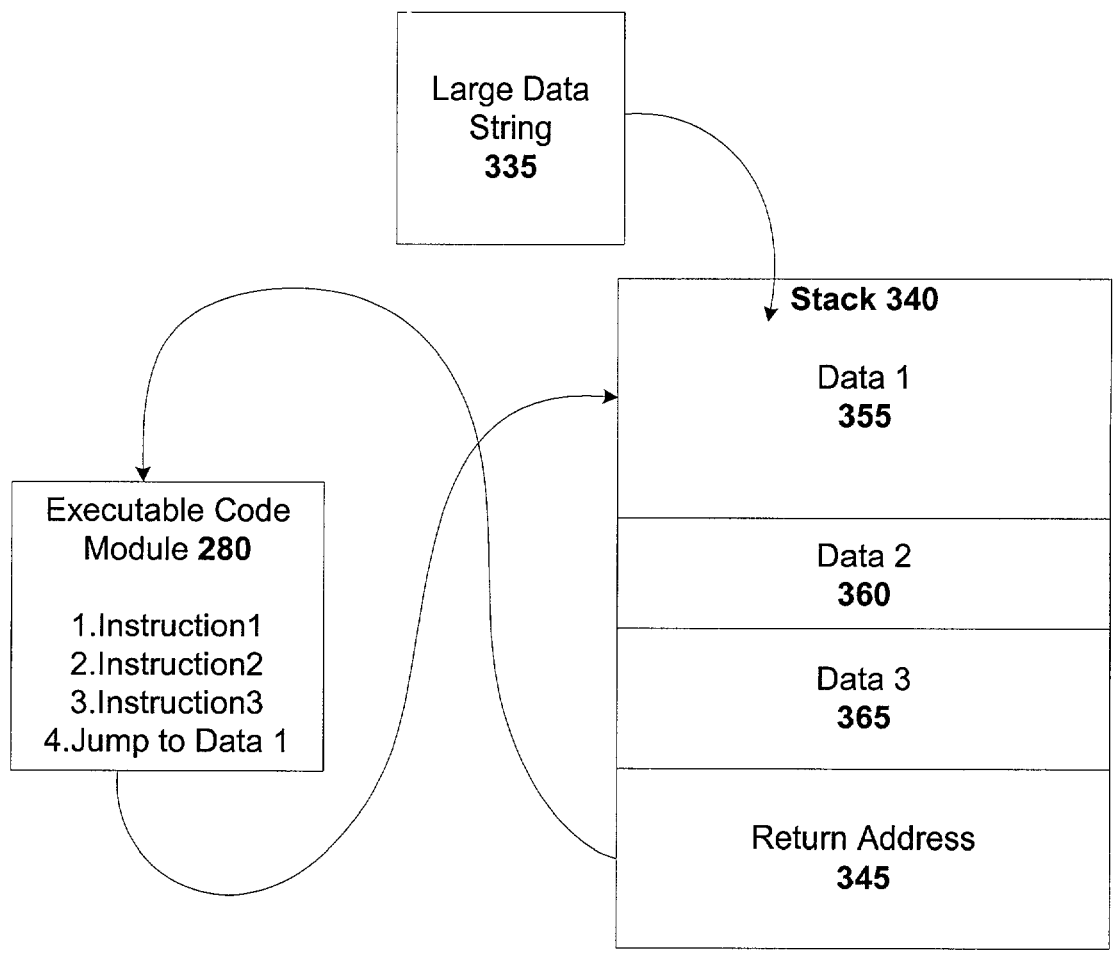
FIG. 3B is a block diagram showing a more detailed view of the stack 340 for an application process 205 in accordance with one embodiment of the present invention.

FIG. 3B is a block diagram showing a more detailed view of the stack 340 for the application process 205 in accordance with one embodiment of the present invention. The stack 340 includes a collection of different data areas 355, 360, 365. Though only three data areas are shown, a stack can have any practical number of such areas. These data locations are used to store various data values for the application process 205. As discussed above, the stack 340 is generated to store data having size and characteristics that are already known. Thus, the data areas 355, 360, 365 often have fixed capacities. The stack 340 further includes a data area 345 designated for a return address. Executable code typically concludes with a call to a return address.

The application process 205 will function by pushing a return address onto a stack, and then pushing additional values onto the stack. By way of example, a first routine, which accepts data of known size from a specified input, will push its return address onto the stack and then call a second routine dedicated to accepting and storing the input. The second routine, after storing the input, will call the originally inserted return address and return control to the first routine at its last execution point.

Viruses employ buffer overflow attacks to take control of a computer system on which a process having a stack is executing by feeding a data string 335 into one of the data areas 355, 360, 365 larger than the area is designed to accept so as to overwrite other areas, including the return address 345. By way of example, the web server 155 may be designed to accept GET requests from remote systems and store the headers, which are a maximum of 30 bytes, in data area 355. A virus currently residing on remote system 175, seeking to spread itself to web server 155, can submit a GET request having a header which is 55 bytes long, that overflows the data areas 355, 360, 365 and spills into return address area 345.

As the sizes of the data areas for the stacks of many applications are well known, a virus can be configured to submit a string of length such that the previous return address is replaced with a return address of the virus designer's choosing. Furthermore, the data areas of the stack 355, 360, 365 are now filled with virus code.

Thus, when the routine which receives the HTTP GET requests makes a call to the return address area 345 of the stack 340, rather than reading a return address containing the address of another benign routine, it reads a return address pointing towards executable virus code. Typically, this new return address points to another location 355 in the stack 340, which has been rewritten with executable virus code, through the buffer overflow.

However, in some operating systems, it is not possible to determine the memory address of the newly inserted virus code, because the stack may not have a fixed location in logical memory 285. Instead, the location of the stack is specified by a register in the CPU. Thus, virus designers seeking to attack these systems configure the viruses to make a call to commonly used executable code modules, having well-known addresses, that are configured to call the stack or another data area susceptible to malicious code.

By way of example, the virus discussed above submits an HTTP GET request and inserts executable virus code into the data areas 355, 360, and 365, and a new return address into the return address area 345. The new return address is the well-known address of an entry point to a commonly used executable code module 280. The instructions in the executable code module 280 include a call to the stack 340. The stack 340 may have a fixed location or a variable location that is tracked by a data register. At this point, the operating system begins to execute the virus code located in the initial data area of the stack 355.

However, if the commonly used executable code module 280 is moved to a different location, the modified return address will point to an alternate location, producing an error, but averting the execution of the virus.

Figure 4:
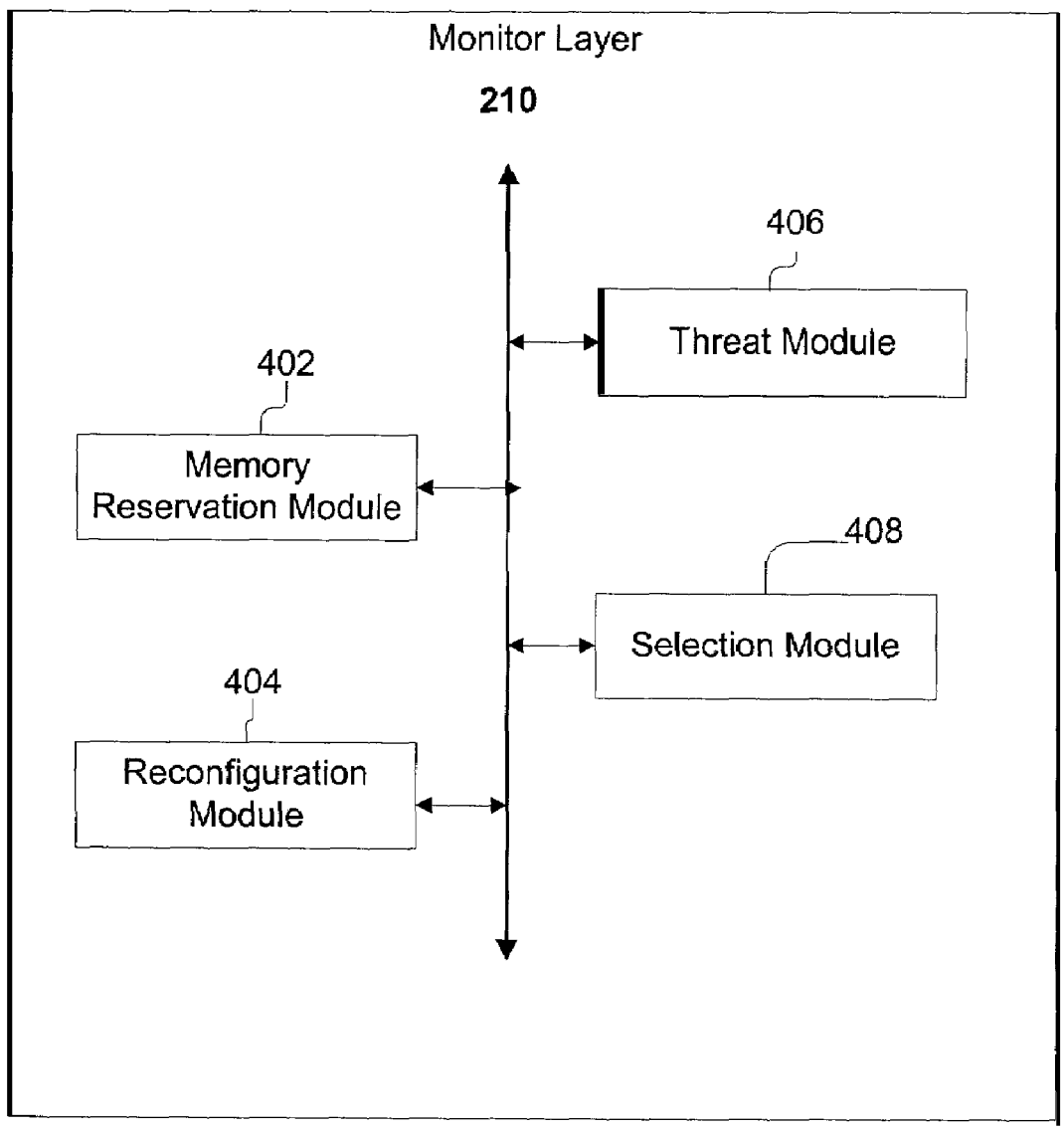
FIG. 4 is a block diagram illustrating a component overview of a monitor layer 210 in accordance with one embodiment of the present invention.

FIG. 4 illustrates a component overview of a monitor layer 210 in accordance with one embodiment of the present invention. The modules illustrated in FIG. 4 are preferably stored on the storage device 108 and loaded into system memory 106. However, the modules forming the monitor layer 210 may also be stored in firmware, program logic, or any hardware or circuitry utilized to provide the functionality of these modules. The monitor layer includes threat module 406, which is configured to determine whether an executable code module 280 is a high-risk module and to designate high-risk modules as such. The monitor layer 210 further includes a selection module 408. The selection module 408 is configured to determine the alternate load location of a high-risk module 406. The determination of the new load location may be performed randomly or according to predetermined criteria. The selection module 408 passes the new memory address to either the memory reservation module 402 or the reconfiguration module 404.

In embodiments where the monitor layer 210 has been configured to sit between an application process 205 and the operating system 220, the memory reservation module 402 is configured to reserve a section of memory including the preferred load location 295 of the executable code module 280. When the memory reservation module 402 receives an alternate load location from the selection module 408, the memory reservation module 402 is configured to reserve memory space between the preferred load location 295 and the alternate load location 290, so as to force the operating system 220 to load the executable code module 280 in the alternate load location 290.

Alternately, rather than reserving continuous blocks, the reservation module 402 can reserve smaller sections of memory, so as to insure that there are no "open" spaces in memory large enough to store the executable code module 280, thus forcing the operating system 220 to load the executable code module 280 at the next available unreserved range, which would be at the alternate load location 290. Thus, if an executable code module having a size of 20,000 bytes would normally reside in the range from memory address 250,000 to memory address 270,000, and the selection module 408 has determined that the executable code module should stored in the range from 290,000 to 310,000, the memory reservation module 408 can reserve small ranges of memory at 252,000, 271,000, and 289,999. The operating system 220 would look for the first uninterrupted range of 20,000 bytes and load the executable code module at memory address 290,000.

The monitor layer 210 further includes a memory reconfiguration module 404. In those embodiments where the monitor layer 210 sits between the file system 235 and the operating system 220, the memory reconfiguration module 404 is configured to alter the preferred load locations of executable code modules. The memory reconfiguration module 404 performs this function by tagging an outgoing module request sent to the file system 235. When a tagged module is passed back by the file system 235, the memory reconfiguration module 404 alters the preferred load location located in the header of the executable code module 280. When the operating system 220 receives the executable code module 280, the operating system 220 loads the module 280 to the alternate load location 290.

Figure 5:
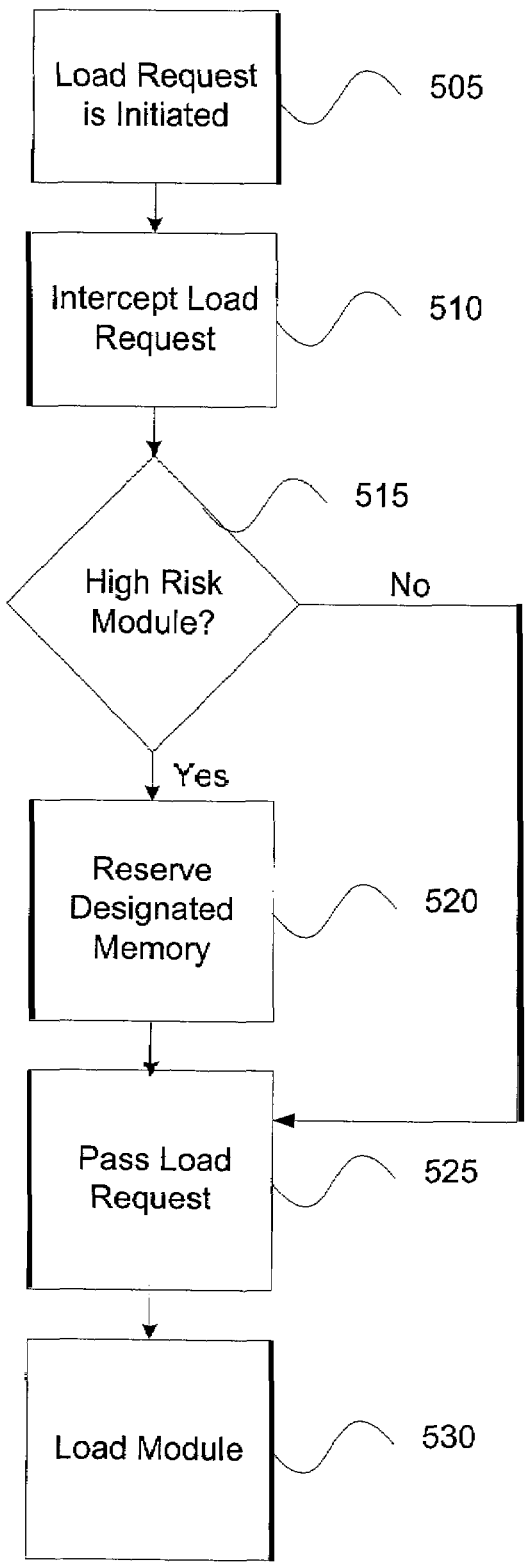
FIG. 5 is a flow chart illustrating a method for preventing buffer overflow attacks by reserving a common memory location in accordance with one embodiment of the present invention.

FIG. 5 is a flow chart illustrating a method for preventing buffer overflow attacks by reserving a memory location in accordance with one embodiment of the present invention. The method begins when an application process 205 or the operating system 220 attempts to load 505 an executable code module 280. The request is intercepted 510 by the monitor layer 210. The threat module 406 determines 515 whether the request corresponds to a high-risk executable code module 280. In a first embodiment, a high-risk module is a commonly used module containing executable code that includes a jump to a data area. In a second embodiment, all modules used by multiple application processes are determined to be high-risk. In a third embodiment, all modules containing executable code are determined to be high-risk.

If the executable code module 280 is determined not to be high-risk, the load request is passed forward and the executable code module 280 is loaded 530. If the executable code module 280 is determined to be a high-risk module, the selection module 408 determines an alternate load location for the executable code module 280. The new address may be generated at random or selected according to predetermined factors. The memory reservation module 402 then reserves 520 locations in memory between the preferred load location 295 and the alternate load location 290. The request is then passed 525 to the operating system 220, which, finding the preferred load location 295 occupied, loads 530 the executable code module 280 to the alternate load location 290.

Figure 6:
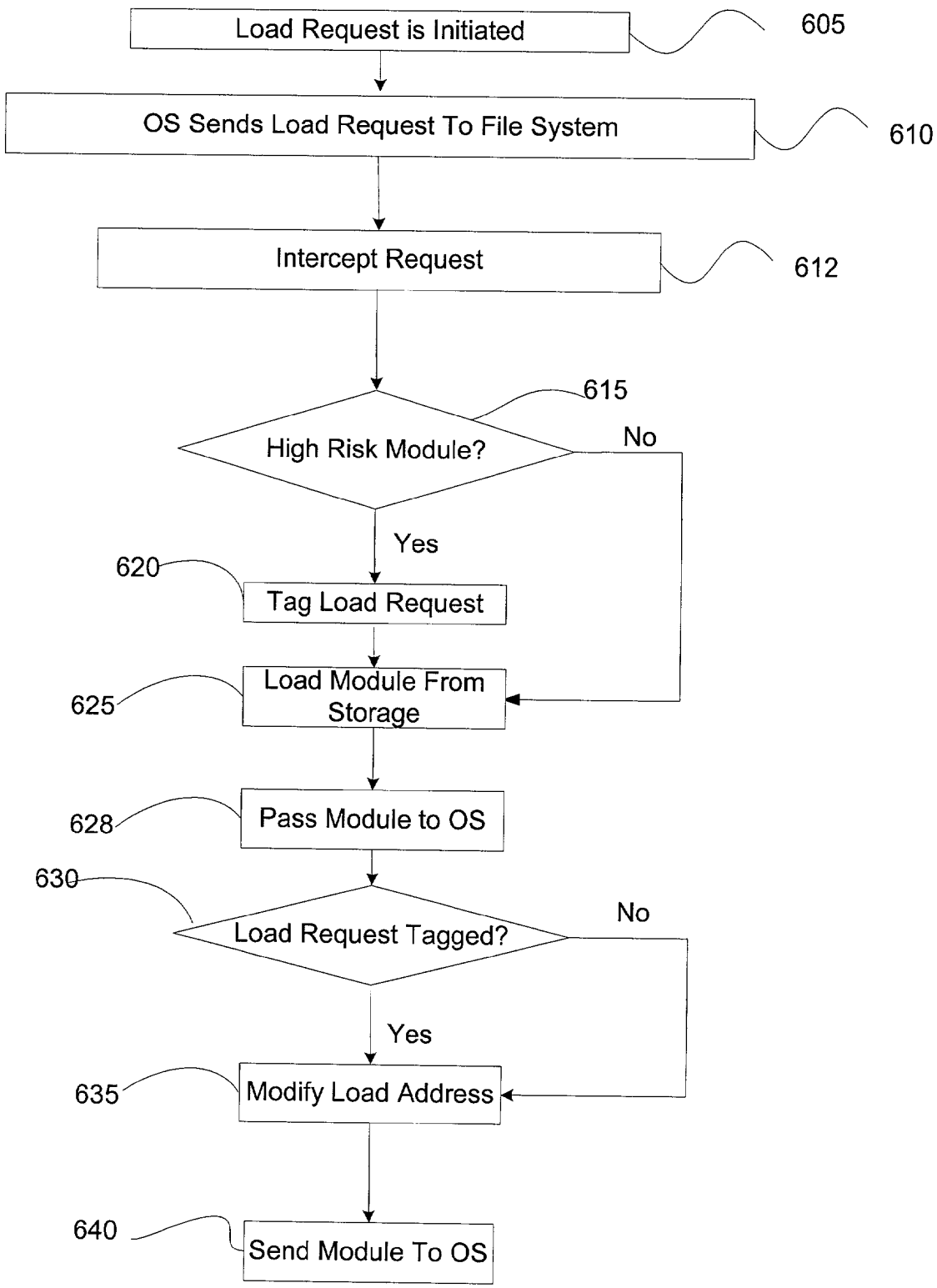
FIG. 6 is a flow chart illustrating a method for preventing buffer overflow attacks by altering the preferred load location of an executable code module in accordance with a second embodiment of the present invention.

FIG. 6 is a flow chart illustrating a method for preventing buffer overflow attacks by altering the preferred load location 295 of an executable code module 280 in accordance with a second embodiment of the present invention. In this embodiment, the monitor layer 210 sits between the operating system 220 and the file system 235. The method begins with the operating system 220 or an application process 205 initiating a load request (step 605). The operating system 220 processes the load request and sends 610 it to the file system 235. The monitor layer 210 intercepts the request (step 612). The threat module 406 determines 615 whether the request corresponds to a high-risk executable code module 280.

If the executable code module 280 is not determined to be high-risk, the request is passed along to the file system 235 without alteration. If the executable code module 280 is determined to be high-risk, the request is tagged 620 as being associated with a high-risk module. The request is then passed to the file system 235, which extracts 625 the module 280 from data storage. When the file system 235 attempts to pass 628 the executable code module 280 to the operating system 220, the monitor layer 210 intercepts the module 280. The module 280 is checked 630 for an associated tagged request. If the load request is tagged, the selection module 408 determines an alternate load location for the executable code module 280 and passes the alternate load location to the reconfiguration module 404. If the load request is not tagged, the executable code module 280 is passed along without alteration. The new address may be generated at random or selected according to predetermined factors. The reconfiguration module 404 rewrites 635 the section of the module 280 pertaining to its preferred load location and passes 640 the module 280 to the operating system 220. The operating system 220 scans the executable code module 280 for its preferred load location and stores it in the alternate load location 290.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for preventing a buffer overflow attack in a computer system, comprising the steps of:
   detecting an attempt to load an executable code module having a preferred memory load location address into a memory of the computer system;
   determining whether the executable code module is a high-risk module susceptible to enabling a buffer overflow attack; and
   responsive to a determination that the executable code module is a high-risk module, causing the high-risk module to load in a memory location address other than the preferred memory load location address.

2. The method of claim 1, wherein the step of causing the high-risk module to load in a memory location address other than the preferred memory load location address comprises the sub-step of reserving an area of memory including a portion of the preferred memory load location address.

3. The method of claim 1, wherein the step of causing the high-risk module to load in a memory location address other than the preferred memory load location address comprises the sub-steps of:
   intercepting an attempt to load the high-risk module from a data storage; and
   replacing the preferred memory load location address of the high-risk module with an alternate preferred memory load location address so that the high-risk module is loaded to the alternate preferred memory load location address.

4. The method of claim 1, wherein the step of determining whether the executable code module is a high-risk module comprises the sub-step of determining whether the executable code module is used by multiple application processes.

5. The method of claim 1, wherein all executable code modules are determined to be high-risk modules.

6. The method of claim 1, wherein the step of determining whether the executable code module is a high-risk module comprises the sub-step of determining whether the executable code module contains executable code having instructions for calling a section of memory susceptible to malicious code.

7. The method of claim 6, wherein the section of memory is a stack.

8. A system for preventing buffer overflow attacks in a computer system comprising:
   a threat module configured to read a load request, the load request having an associated executable code module, said threat module further configured to determine whether the associated executable code module is a high-risk module susceptible to enabling a buffer overflow attack; and
   a selection module in communication with the threat module, configured to determine an alternate memory load location address for the executable code module in response to a determination by the threat module that the executable code module is a high-risk module.

9. The system of claim 8, further comprising a memory reservation module, in communication with the selection module, configured to receive the alternate memory load location address from the selection module and to cause the executable code module to load in the alternate memory load location address by reserving a portion of the preferred load location of the executable code module.

10. The system of claim 8, further comprising a memory reconfiguration module in communication with the selection module and configured to replace a preferred memory load location address of the associated executable code module with the alternate memory load location address determined by the selection module.

11. The system of claim 8, wherein the threat module is configured to determine that the associated executable code module is a high-risk module when the executable code module is used by multiple application processes.

12. The system of claim 8 wherein all executable code modules are determined to be high-risk modules.

13. The system of claim 8, wherein the threat module is configured to determine that the associated executable code module is a high-risk module when the associated executable code module contains executable code having instructions for reading a section of memory susceptible to malicious code.

14. The system of claim 13, wherein the section of memory is a stack.

15. A computer program product comprising:
   a computer readable medium storing computer executable instructions for preventing a buffer overflow attack, the instructions comprising:
   detecting an attempt to load a an executable code module having a preferred memory load location address;
   determining whether the executable code module is a high-risk module susceptible to enabling a buffer overflow attack; and
   responsive to a determination that the executable code module is a high-risk module, causing the high-risk module to load in a memory location address other than the preferred memory load location address.

16. The computer program product of claim 15, wherein the instructions for causing the high-risk module to load in a memory location address other than the preferred memory load location address comprise instructions for reserving an area of memory including a portion of preferred memory load location address.

17. The computer program product of claim 15, wherein the instructions for causing the high-risk module to load in a memory location address other than the preferred memory load location address comprise instructions for:

intercepting an attempt to load the high-risk module from a data storage; and replacing the preferred memory load location address of the high-risk module with an alternate preferred memory load location address so that the high-risk module is loaded to the alternate preferred memory load location address.

18. The computer program product of claim 15, wherein the instructions for determining whether the executable code module is a high-risk module comprise determining whether the executable code module is used by multiple application processes.

19. The computer program product of claim 15, wherein the instructions for determining whether the executable code module is a high-risk module comprise determining whether the executable code module includes executable code having instructions for calling a section of memory susceptible to malicious code.

* * * * *

UNITED STATES PATENT AND TRADEMARK OFFICE
CERTIFICATE OF CORRECTION

| | | |
|---|---|---|
| PATENT NO. | : 7,155,741 B2 | Page 1 of 1 |
| APPLICATION NO. | : 10/140149 | |
| DATED | : December 26, 2006 | |
| INVENTOR(S) | : Sobel et al. | |

It is certified that error appears in the above-identified patent and that said Letters Patent is hereby corrected as shown below:

At claim 15, column 10, line 48, please remove "a" before "an".

Signed and Sealed this

Twenty-second Day of May, 2007

JON W. DUDAS
*Director of the United States Patent and Trademark Office*